(12) United States Patent
Pedersen

(10) Patent No.: US 8,648,488 B2
(45) Date of Patent: Feb. 11, 2014

(54) WIND TURBINE

(75) Inventor: Gunnar Kamp Storgaard Pedersen, Skjern (DK)

(73) Assignee: Vestas Wind Systems A/S, Aarhus N (DK)

(*) Notice: Subject to any disclaimer, the term of this patent is extended or adjusted under 35 U.S.C. 154(b) by 326 days.

(21) Appl. No.: 13/139,911

(22) PCT Filed: Dec. 11, 2009

(86) PCT No.: PCT/DK2009/000252
§ 371 (c)(1),
(2), (4) Date: Jun. 15, 2011

(87) PCT Pub. No.: WO2010/069314
PCT Pub. Date: Jun. 24, 2010

(65) Prior Publication Data
US 2011/0260465 A1   Oct. 27, 2011

Related U.S. Application Data

(60) Provisional application No. 61/122,904, filed on Dec. 16, 2008.

(30) Foreign Application Priority Data

Dec. 16, 2008   (DK) .................................. 2008 01789

(51) Int. Cl.
*F03D 9/00* (2006.01)
*H02P 9/04* (2006.01)

(52) U.S. Cl.
USPC .......................................................... 290/55

(58) Field of Classification Search
USPC .................................................... 290/55, 44
See application file for complete search history.

(56) References Cited

U.S. PATENT DOCUMENTS

| 7,109,600 | B1* | 9/2006 | Bywaters et al. | 290/55 |
| 2005/0230979 | A1 | 10/2005 | Bywaters et al. | |
| 2011/0278852 | A1* | 11/2011 | Hjort | 290/55 |

FOREIGN PATENT DOCUMENTS

| CN | 201092937 | 7/2008 |
| EP | 1 008 747 | 6/2000 |
| EP | 1 101 934 | 5/2001 |
| EP | 1 677 007 | 7/2008 |
| GB | 2 040 429 | 8/1980 |
| WO | 99/63219 | 12/1999 |

OTHER PUBLICATIONS

Jorgen Olsen; 1st Technical Examination and Search Report issued in priority Denmark Application No. PA 2008 01789; Jul. 31, 2009; 5 pages; Denmark Patent and Trademark Office.
Pavlos Avramidis; International Search Report and Written Opinion issued in International Application No. PCT/DK2009/000252; Oct. 6, 2010; 13 pages; European Patent Office.
Pavlos Avramidis; International Preliminary Report on Patentability issued in International Application No. PCT/DK2009/000252; Mar. 16, 2011; 8 pages; European Patent Office.

* cited by examiner

*Primary Examiner* — Javaid Nasri
(74) *Attorney, Agent, or Firm* — Wood, Herron & Evans, LLP

(57) ABSTRACT

A wind turbine connected to a utility grid includes a nacelle, at least one transformer for feeding generated power to the utility grid, and a flexible suspension arrangement connected to a load carrying structure of the nacelle and suspending the transformer above a floor level of the nacelle.

16 Claims, 5 Drawing Sheets

WIND TURBINE

TECHNICAL FIELD

The present invention relates to a wind turbine connected to a utility grid.

BACKGROUND

It is a known operational phenomenon in wind turbines that vibrations are introduced in longitudinal and transverse directions especially by the rotor pressure of the wind and the rotation of the rotor blades.

Introduced vibrations in the wind turbine of a size larger than predefined values may be a problem in relation to an increased number of forced shut downs and service intervals for the wind turbine as well as a possible reduction in the estimated wind turbine life span.

Different active and passive solutions have previously been suggested in removing wind turbine vibrations above predefined values such as pitch strategies reducing the wind turbine load or heavy dampers positioned in the upper part of the tower, i.e., a reduction in power generation or a significant increase in the weight of the wind turbine, respectively.

An object of the present invention is therefore to provide a vibration damping solution for a wind turbine without the abovementioned problems.

SUMMARY

According to the present invention is provided a wind turbine connected to a utility grid, the wind turbine comprising a nacelle, at least one transformer for feeding generated power to the utility grid, and a flexible suspension arrangement connected to a load carrying structure of the nacelle and suspending the transformer above a floor level of the nacelle.

The transformer is allowed to sway by the suspension arrangement and is hereby flexibly avoiding or even counteracting nacelle vibrations instead of being a rigid part of the nacelle mass adding to the vibrations. As the transformer is a significant part of the total nacelle weight it is hereby possible to reduce the other means for damping vibrations in the wind turbine such as the separate dampers positioned in the upper part of the tower.

Further, as the transformer is positioned on a tower of a significant length and is removed from the standard vibrating mass with the invention it may also be possible to reduce the tower or foundation material use or strength as the they are facing reduced vibrations.

The term "flexible" in relation to the suspension arrangement should be understood as any form of non-rigid suspension allowing the transformer to sway in at least one direction in response to nacelle vibrations.

In an aspect of the invention the suspension arrangement includes a cardan, ball or similar universal coupling joint in a connection between the nacelle and transformer allowing the transformer to sway. Hereby are advantageous embodiments of the suspension arrangement obtained by integrating the flexibility into a separate arrangement in relation to the nacelle structure.

In another aspect of the invention the suspension arrangement includes a centre part with a first shaft connecting the arrangement to the load carrying structure and a second perpendicularly orientated shaft connected to the transformer allowing the transformer to sway in two directions by the cardan functionality. Hereby is an advantageous embodiment of the suspension arrangement obtained by using existing parts of the nacelle structure in establishing a cardan functionality.

In a further aspect of the invention the first and second shafts are orientated in a transverse and longitudinal direction of the nacelle. The transformer is hereby allowed in a controlled manner to sway in the same directions as the vibrations introduced by the rotor load from the wind and the rotation of the rotor blades.

In an aspect of the invention the suspension arrangement is connected to a load carrying structure of the internal nacelle crane system, for example, two side members in the shape of longitudinal steel beams beneath the nacelle ceiling. The suspension of the transformer is advantageously simplified by the use of existing nacelle structures prepared for carrying heavy loads.

In another aspect of the invention the suspension arrangement is connected to an internal load carrying structure of the nacelle ceiling, for example, a self-loading frame structure of the nacelle. Modern nacelles comprise some form of self-loading frame structure ensuring that the walls and ceiling may carry a significant weight beyond the load of the wind pressure and the like. Consequently, it is again possible to advantageously simplify the suspension by use of an existing nacelle structure.

In an aspect of the invention one or more movement dampers are connected between the transformer and nacelle. Hereby it is possible to restrict or even control the movement of the transformer in an advantageous manner instead of using some form of mechanical end stops or restrictions in the suspension arrangement.

In an aspect of the invention the one or more movement dampers are two or four shock dampers connected to corner regions of the transformer, for example, at the foot of the transformer and to the corresponding nacelle walls. By connection to all the transformer corners or opposite corners it is easier to restrict or control the movements and especially to avoid transfer of unbalanced loads to the movement dampers.

In an aspect of the invention the one or more movement dampers are hydraulic cylinders. Hydraulic damper solutions are advantageous in heavy duty situations and other hydraulic systems are usually present in the nacelle which may simplify the implementation of active control systems.

In an aspect of the invention the one or more movement dampers are controllable and/or lockable with control means in relation to predefined limit values of transformer movement and/or wind turbine oscillations or loads. By establishing an active control system it is possible to use the weight of the transformer in damping vibrations or loads in the wind turbine.

BRIEF DESCRIPTION OF THE DRAWINGS

The invention will be described in the following with reference to the figures in which.

DETAIL DESCRIPTION

Figure 1:
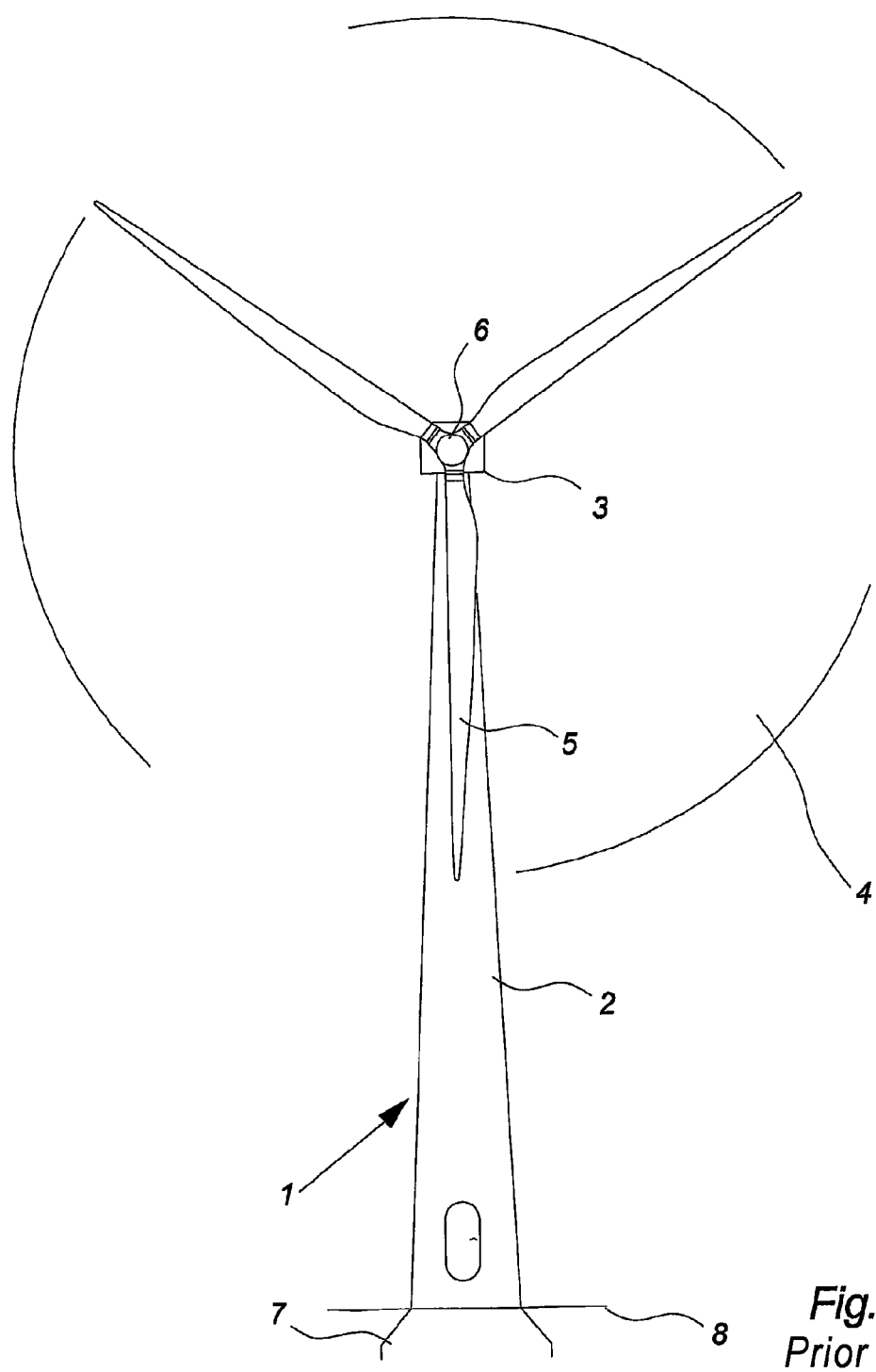
FIG. 1 illustrates a large modern wind turbine as known in the art.

FIG. 1 illustrates a large modern wind turbine 1 as known in the art, comprising a tower 2 and a wind turbine nacelle 3 positioned on top of the tower 2. In this embodiment the wind turbine rotor 4 comprises three wind turbine blades 5 mounted on a common hub 6 which is connected to the nacelle 3 through the low speed shaft extending out of the nacelle 3 front. In another embodiment the wind turbine rotor 4 could comprise another number of blades 5 such as one, two, four, five or more.

The wind turbine is erected on a concrete foundation 7 mainly positioned below a ground level 8 in order to establish a wind turbine for connection to a utility grid (not illustrated on the figure) transferring the generated power to utility customers.

Figure 2:
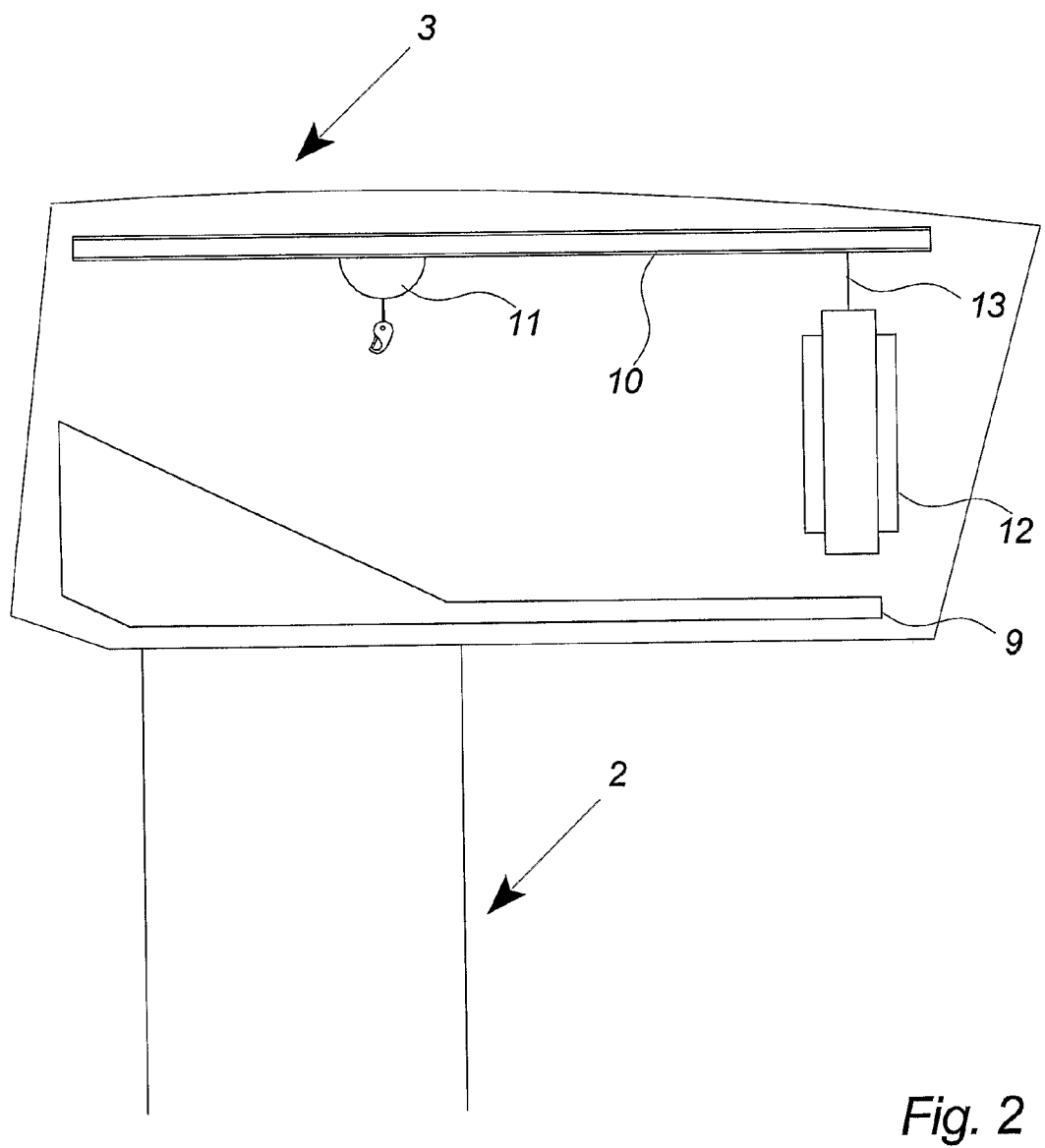
FIG. 2 illustrates a simplified cross sectional view of a nacelle with a suspended transformer, as seen from the side.

FIG. 2 illustrates a simplified cross sectional view of a nacelle 3, as seen from the side, for example, without a number of the main components being present for clarity purposes.

The nacelle is illustrated with a transformer 12 suspended above a floor level 9 in the rear part of the nacelle. The transformer is suspended in a flexible suspension arrangement 13 attached to a load carrying structure 10 of the nacelle.

The floor level 9 is illustrated as being a part of (or an attachment to) the nacelle bedframe connected to the tower 2, for example, via a yaw mechanism (not illustrated on the figure) allowing wind load to be transferred from the rotor through the bedframe to the tower and foundation.

The load carrying structure 10 may be two steel beams orientated longitudinally in the nacelle and attached to the nacelle ceiling in proximity of the nacelle walls. The steel beams are part of the internal crane system 11 in the nacelle allowing different types of larger service operations when the wind turbine is not operational.

The transformer 12 transforms the electric power generated by the generator (not illustrated in the figure) to a different high voltage level for feeding the power to the utility grid. A standard transformer in a modern wind turbine usually weights several tons, for example, in the range of 8 to 10 tons.

Figure 3:
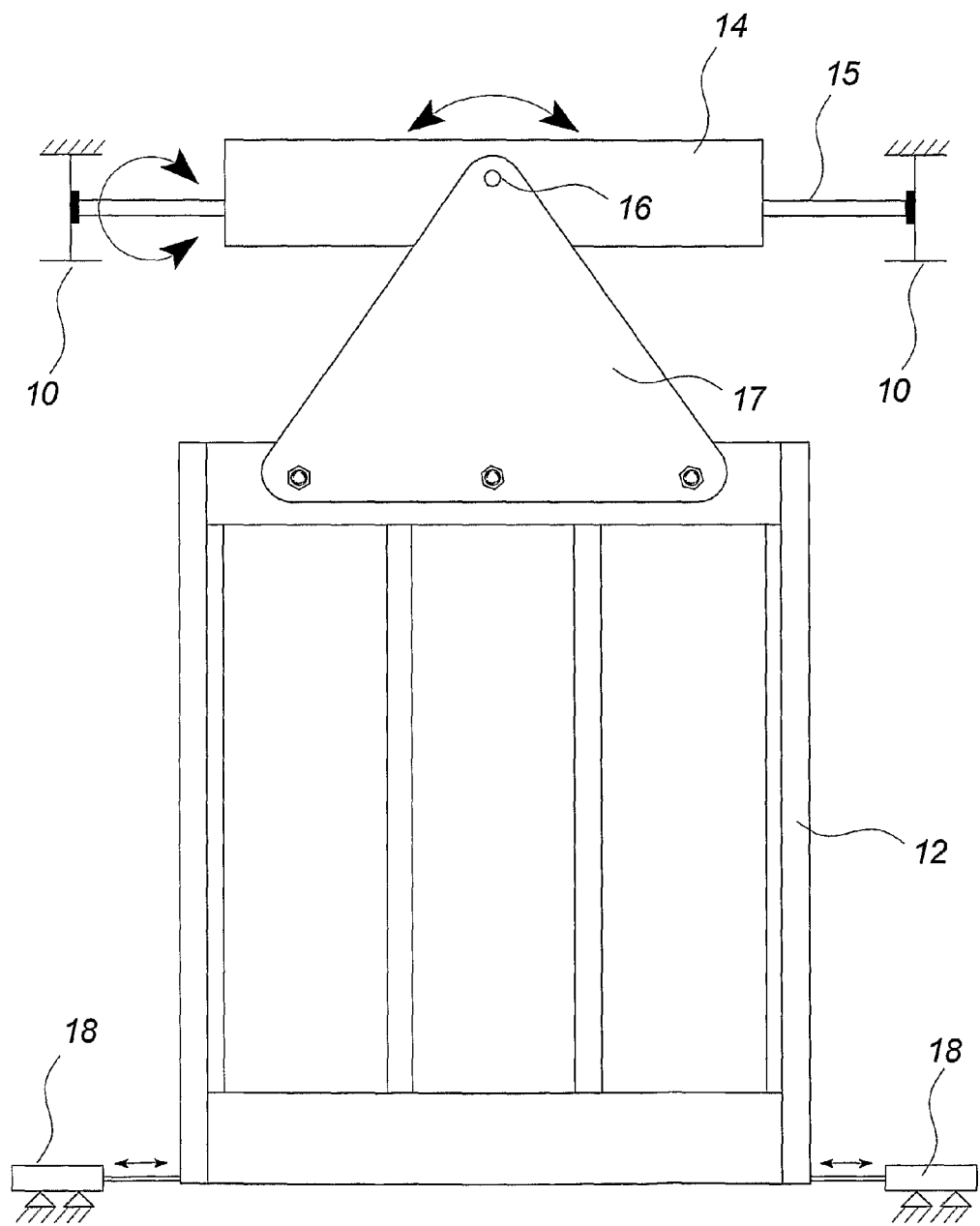
FIG. 3 illustrates in more details an embodiment of the invention including the suspension arrangement of the transformer, as seen from the rear of the nacelle.

FIG. 3 illustrates in more detail an embodiment of the invention including the suspension arrangement 13 of the transformer 12, as seen from the rear of the nacelle.

The suspension arrangement 13 includes a centre part 14 penetrated by a first and second shaft 15, 16. The first shaft 15 is fastened between the two steel beams 10 of the of the internal crane system, i.e., directed transversely/crosswise of the nacelle. The second shaft 16 is fastened with connection plates 17 on opposite side of the centre part to the upper frame of the transformer 12 and directed longitudinally/lengthwise of the nacelle.

Shaft channels in the centre part 14 allow the shafts to rotate freely (as illustrated with the arrows), i.e., allowing the transformer to sway in two directions by the cardan functionality. Alternatively the free rotation may be established by fixating the shafts to the centre part and allowing the shafts to rotate in the connections to the beams 10 and the connection plates 17.

The perpendicular shafts 15, 16 may be displaced above each other as illustrated on the figure or levelled by dividing one shaft into two shaft ends.

As the transformer 12 is suspended above a floor level of the nacelle and may sway in the flexible suspension arrangement 13 it illustrated that the transformer may also be provided with movement dampers 18, for example, at the lower part of the frame. The movement dampers may ensure that the swaying of the transformer does not increase beyond a level, for example, defined by general safety guidelines as well as distances to other nacelle components and walls.

Figure 4:
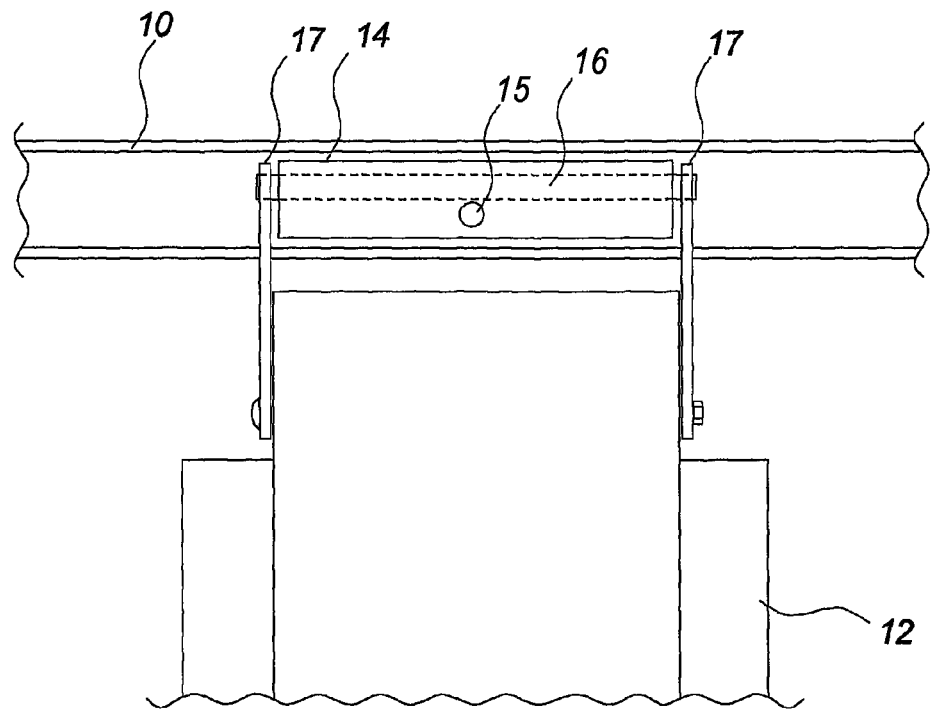
FIG. 4 illustrates an enlarged sectional side view of the flexible suspension arrangement of the embodiment in FIG. 3, as seen from one steel beam toward the other.

FIG. 4 illustrates an enlarged sectional side view of the flexible suspension arrangement 13 of the embodiment in FIG. 3, as seen from one steel beam toward the other.

The figure especially illustrates the second shaft 16 attached to the two connection plates 17 on opposite side of the centre part 14. Further, it also illustrates the displacement of the two shafts with the second shaft 16 penetrating and going through the centre part 14 above the first shaft 15.

Figure 5:
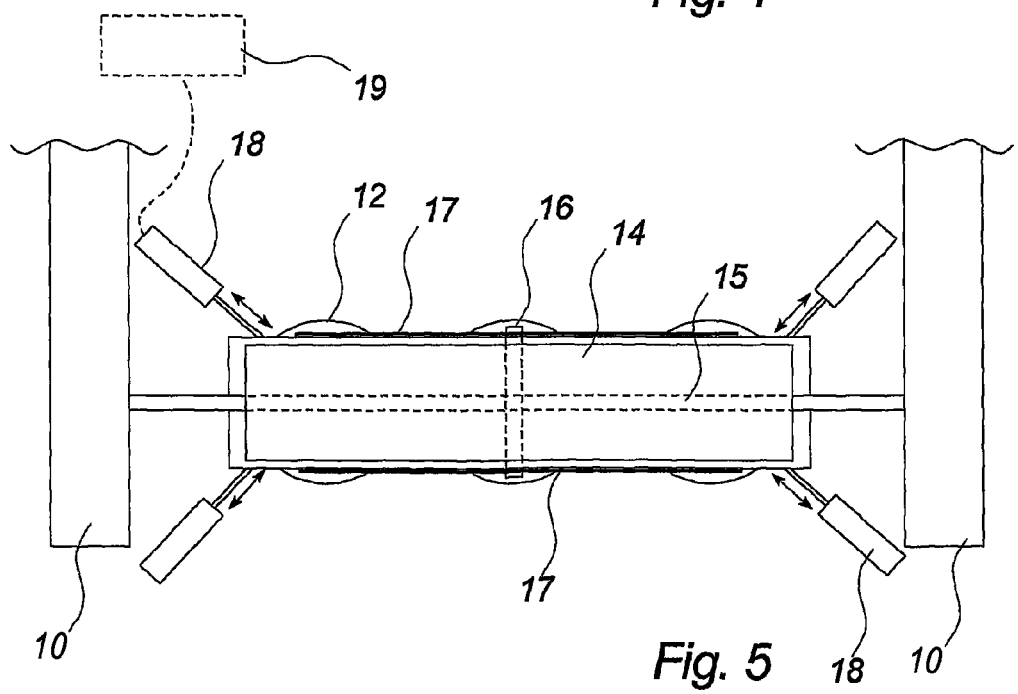
FIG. 5 illustrates the suspension of the transformer, as seen from above.

FIG. 5 illustrates a sectional view of the embodiment in FIG. 3, as seen from above.

The figure especially illustrates the attachment of the first shaft 15 to the two steel beams 10 and the attachment of the second shaft 16 to the connection plates 17 via the centre part 14. Further, it also illustrates four movement dampers 18 being connected to the four corner regions of the transformer 12 and to a nacelle structure wherein the arrows illustrates their functionality of damping the transformer movement in the flexible suspension arrangement.

The movement dampers may be standard shock absorbers, struts or a similar absorber type passively damping a movement.

The figure also illustrates schematically that one or more movement dampers 18 may be actively controlled by a control system 19, for example, a system which includes different measurements of the wind turbine such as values from vibration or load measurements in the nacelle, tower and/or foundation as well as values of the transformer movement. The control system may in response to the measured values initiate individual control of fluid or electricity supply to the movement dampers in order to use the transformer as an active damping weight in the wind turbine.

The control system may also respond by locking the movement dampers in one position allowing the transformer to only perform a defined movement in order to counteract a given vibration or load situation.

Figure 6:
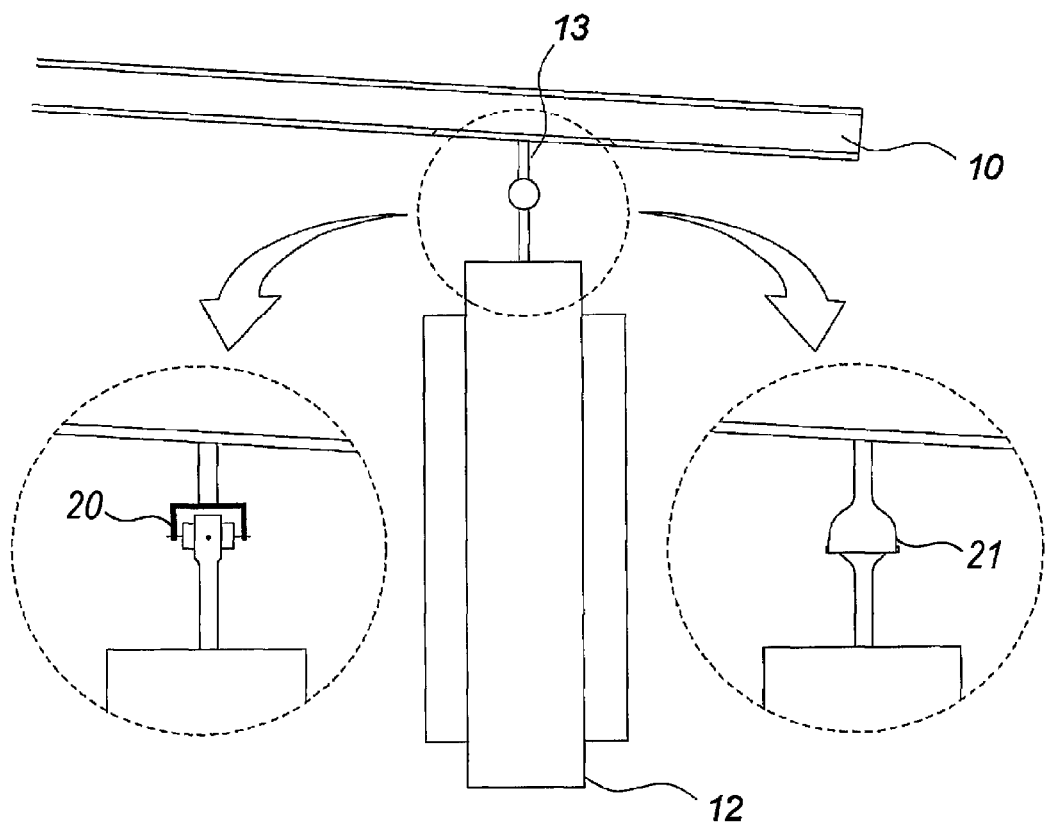
FIG. 6 illustrates further embodiments of a flexible suspension arrangement for the suspended transformer.

FIG. 6 illustrates alternative types of flexible suspension arrangements for the transformer 12. Further, the figure illustrates a slightly sloping beam section of an alternative load carrying structure 10 of the nacelle; the beam section schematically representing a ceiling part of the internal self-loading frame structure of the nacelle.

The flexible suspension arrangement is illustrated as a connection pole between the load carrying structure 10 and the transformer 12 wherein the pole is divided by a universal coupling joint allowing the transformer to sway in the arrangement.

The enlargements of the coupling joint illustrate schematically two different embodiments of universal coupling joints. The left enlargement illustrates the flexible suspension arrangement as a cardan coupling 20 and the right enlargement illustrates it as a ball coupling 21 wherein bolts through the lower side of the embracing part keep the ball flexibly in place.

The invention has been exemplified above with reference to specific examples of the invention including flexible suspension arrangements. However, it should be understood that the invention is not limited to the particular examples described above but may be designed and altered in a multitude of varieties within the scope of the invention as specified in the claims, for example, with other types of universal coupling joints allowing the transformer to sway.

LIST

1. Wind turbine
2. Tower
3. Nacelle
4. Rotor
5. Blade
6. Hub
7. Foundation
8. Ground level
9. Bedplate or similar frame structure defining a floor level of the nacelle
10. Load carrying structure of the nacelle
11. Internal nacelle crane system
12. Transformer for feeding generated power to the utility grid
13. Flexible suspension arrangement
14. Centre part for a first and second shaft
15. First shaft connecting the arrangement to the load carrying structure
16. Second shaft connected to said transformer
17. Connection plates
18. Movement dampers
19. Control system for the movement dampers

The invention claimed is:

1. A wind turbine connected to a utility grid, said wind turbine comprising:
    a nacelle,
    at least one transformer for feeding generated power to the utility grid, and
    a flexible suspension arrangement connected to a load carrying structure of the nacelle and suspending said transformer above a floor level of the nacelle, wherein one or more movement dampers are connected between said transformer and nacelle, wherein said flexible suspension arrangement suspends said transformer above the floor level of the nacelle during operation of the wind turbine, and wherein said flexible suspension arrangement carries substantially the entire weight of the transformer.

2. The wind turbine according to claim 1, wherein said suspension arrangement includes a cardan, ball or universal coupling joint in a connection between said nacelle and transformer allowing the transformer to sway.

3. The wind turbine according to claim 1, wherein said suspension arrangement includes a centre part with a first shaft connecting the arrangement to said load carrying structure and a second perpendicularly orientated shaft connected to said transformer allowing the transformer to sway in two directions by the cardan functionality.

4. The wind turbine according to claim 3, wherein said first and second shafts are orientated in a transverse and longitudinal direction of the nacelle.

5. The wind turbine according to claim 1, wherein said load carrying structure to which the suspension arrangement is connected forms part of an internal nacelle crane system.

6. The wind turbine according to claim 1, wherein said suspension arrangement is connected to a self-loading frame structure of the nacelle.

7. The wind turbine according to claim 1, wherein the one or more movement dampers are arranged so to impose damping forces on the transformer primarily in a horizontal direction.

8. The wind turbine according to claim 1, wherein said one or more movement dampers are two or four shock dampers connected to corner regions of the transformer and to the corresponding nacelle walls.

9. The wind turbine according to claim 1, wherein said one or more movement dampers are hydraulic cylinders.

10. The wind turbine according claim 1, wherein said one or more movement dampers are controllable and/or lockable with a control system in relation to predefined limit values of transformer movement and/or wind turbine oscillations.

11. The wind turbine according to claim 1, further comprising a control system operatively coupled to said one or more movement dampers for controlling or limiting the movement of the transformer.

12. A method for reducing vibrations in a nacelle and a tower of a wind turbine connected to a utility grid, the wind turbine comprising at least one transformer being able to feed generated power to the utility grid, wherein the at least one transformer is suspended above a floor level in the nacelle of the wind turbine by means of a flexible suspension arrangement connected to a load carrying structure of the nacelle, wherein the flexible suspension arrangement suspends the transformer above the floor level of the nacelle during operation of the wind turbine, and wherein the flexible suspension arrangement carries substantially the entire weight of the transformer.

13. A method for reducing vibrations in a wind turbine having a nacelle, a load carrying structure in the nacelle, and at least one transformer disposed in the nacelle, comprising:
    suspending the at least one transformer above a floor level of the nacelle using a flexible suspension arrangement connected between the load carrying structure and the at least one transformer such that the suspension arrangement supports substantially the entire weight of the transformer; and
    operating the wind turbine while the transformer is being suspended by the flexible suspension arrangement.

14. The method according to claim 13, further comprising actively controlling the movement of the transformer in response to vibration or load measurements in the wind turbine.

15. The method according to claim 14, further comprising locking the movement of one or more movement dampers to counteract a given vibration or load situation.

16. The method according to claim 13, further comprising:
    coupling one or more movement dampers between the transformer and the nacelle; and
    using the one or more movement dampers to dampen movement of the transformer.

* * * * *